United States Patent [19]
Moskowitz et al.

[11] Patent Number: 5,822,432
[45] Date of Patent: Oct. 13, 1998

[54] METHOD FOR HUMAN-ASSISTED RANDOM KEY GENERATION AND APPLICATION FOR DIGITAL WATERMARK SYSTEM

[75] Inventors: Scott A. Moskowitz, North Miami Beach, Fla.; Marc Cooperman, Palo Alto, Calif.

[73] Assignee: The Dice Company, Miami, Fla.

[21] Appl. No.: 587,944

[22] Filed: Jan. 17, 1996

[51] Int. Cl.$^6$ ............................................. H04L 9/00
[52] U.S. Cl. ............................ 380/28; 380/46; 380/54
[58] Field of Search .................... 380/28, 54, 46; 382/232, 238; 395/615

[56] References Cited

U.S. PATENT DOCUMENTS

| | | |
|---|---|---|
| 4,200,770 | 4/1980 | Hellman et al. .......................... 380/30 |
| 4,218,582 | 8/1980 | Hellman et al. .......................... 380/30 |
| 4,405,829 | 9/1983 | Rivest et al. ............................. 380/30 |
| 4,424,414 | 1/1984 | Hellman et al. .......................... 380/30 |
| 4,748,668 | 5/1988 | Shamir et al. ............................ 380/30 |
| 4,908,873 | 3/1990 | Philibert et al. . |
| 4,979,210 | 12/1990 | Nagata et al. ............................ 380/4 |
| 4,980,782 | 12/1990 | Ginkel . |
| 5,073,925 | 12/1991 | Nagata et al. ............................ 380/4 |
| 5,287,407 | 2/1994 | Holmes ..................................... 380/4 |
| 5,319,735 | 6/1994 | Preuss et al. . |
| 5,365,586 | 11/1994 | Indeck et al. ............................ 380/4 |
| 5,379,345 | 1/1995 | Greenberg ................................ 380/23 |
| 5,408,505 | 4/1995 | Indeck et al. ............................ 380/4 |
| 5,412,718 | 5/1995 | Narasimhalu et al. .................. 380/2 |
| 5,493,677 | 2/1996 | Balogh et al. ........................... 395/615 |
| 5,530,759 | 6/1996 | Braudaway et al. ..................... 380/54 |
| 5,568,570 | 10/1996 | Rabbuni ................................... 382/238 |
| 5,613,004 | 3/1997 | Cooperman et al. .................... 380/28 |
| 5,617,119 | 4/1997 | Briggs et al. ............................ 380/54 |
| 5,636,292 | 6/1997 | Rhoads .................................... 382/232 |
| 5,664,018 | 9/1997 | Leighton .................................. 380/54 |

OTHER PUBLICATIONS

Press, Flannery, Teukolsky and Vetterling, "Numerical Recipes in C", Cambridge University Press, 1988, 12. Fourier Transform Spectral Methods, pp. 398–470.

Pohlmann, Ken C., "Principles of Digital Audio", Third Edition, 1995, pp. 32–37, 40–48, 138, 147–149, 332, 333, 364, 499–501, 508–509, 564–571.

Pohlman, Ken C., "Principles of Digital Audio", Second Edition, 1991, pp. 1–9, 19–25, 30–33, 41–48, 54–57, 86–107, 375–387.

Schneier, B., "Applied Cryptography", John Wiley & Sons, Inc., New York 1994, particularly the following sections for steganography: 4.1 Subliminal Channel, pp. 66–68, 16.6 Subliminal Channel, pp. 387–392, particularly the following sections for cryptography Chapter 1: Foundations, pp. 1–16, Chapter 2: Protocol Building Blocks, pp. 17–41, Chapter 3: Basic Protocols, pp. 42–57. Chapter 12.1: Public–Key Algorithms Background, pp. 273–275, Chapter 14.1: One–Way Hash Functions, Background, pp. 321–324.

(List continued on next page.)

*Primary Examiner*—Salvatore Cangialosi
*Attorney, Agent, or Firm*—Kenyon & Kenyon

[57] ABSTRACT

A method for the human-assisted generation and application of pseudo-random keys for the purpose of encoding and decoding digital watermarks to and from a digitized data stream. A pseudo-random key and key application "envelope" are generated and stored using guideline parameters input by a human engineer interacting with a graphical representation of the digitized data stream. Key "envelope" information is permanently associated with the pseudo-random binary string comprising the key. Key and "envelope" information are then applied in a digital watermark system to the encoding and decoding of digital watermarks. The invention includes improvements to the methods of encoding and decoding digital watermarks. Improvements are: separation of the encoder from the decoder, increased information capacity relative to spread spectrum methods, destruction of content resulting from attempts to erase watermarks, detection of presence of watermarks without ability to access watermark information, multi-channel watermark capability, use of various classes of keys for watermark access control, support for alternative encoding, decoding, or other component algorithms, use of digital notary to authenticate and time stamp watermark certificates.

36 Claims, 1 Drawing Sheet

OTHER PUBLICATIONS

Kahn, D., "The Code Breakers", The Macmillan Company, 1969, particularly the following sections on steganography pp. xiii, 81–83, 513, 515, 522–526, 873.

First International Workshop, Cambridge, U.K., 30 May to 1 Jun. 1996, Joshua R. Smith and Barrett O. Comiskey: *Modulation and Information Hiding in Images,* Springer Verlag, pp. 207–227.

SPIE–EI97, vol. 3022, Martin Kutter et al.: *Digital Signature of Color Images Using Amplitude Modulation,* pp. 518–527.

SPIE–96 Proceedings, vol. 2915, Mar. 1997, Joan Puate & Fred Jordan: *Using Fractal Compression Scheme to Embed a Digital Signature into an Image,* pp. 108–118.

1996 IEEE Int. Conf. on Multimedia Computing and Systems, Jun. 17–23, Hiroshima, Japan, Laurence Boney et al.: *Digital Watermarks for Audio Signals,* pp. 473–480.

Proceedings of EUSIPCO–96, Eighth European Signal Processing Conference, Trieste, Italy, 10–13 Sep. 1996, Laurence Boney et al.: *Digital Watermarks for Audio Signals,* 5 pp.

Proc. of the 1996 IEEE Int. Conf. on Image Processing, vol. III, Mitchell D. Swanson et al.: *Transparent Robust Image Watermarking,* 1996, pp. 211–214.

7th IEEE Digital Signal Processing workshop, Sep. 1–4, 1996, Loen, Norway, Mitchell D. Swanson et al.: *Robust Data Hiding for Images,* pp. 37–40.

NEC Research Institute, Technical Report 95–10, I.J. Cox et al.: *Secure Spread Spectrum Watermarkings for Multimedia,* 33 pp. (1995.

Proceedings of the KnowRight'95 Conference J. Zhao, E. Koch: *Embedding Robust Labels into Images for Copyright Protection,* pp. 242–251.

1995 IEEE Workshop on Nonlinear Signal and Image Processing, Neos Marmaras, Jun. 1995, E. Kock, J. Zhao: *Towards Robust and Hidden Image Copyright Labeling,* 4 pp.

Department of Electrical Engineering, Information Theory Group, Delft University of Technology, Delft, The Netherlands, G.C. Langelaar et al.: *Copy Protection for Multimedia Data based on Labeling Techiques,* Jul. 1996, 9 pp.

IEEE International Computer Processing Conference, Austin, Texas, Nov. 13–16, 1994, R.G. van Schyndel et al.: *A digital Watermark,* pp. 86–90.

Second Asian Image Processing Conference, Singapore, Dec. 6–8, 1995, vol. 2, R.G. van Schyndel et al.: *Towards a Robust Digital Watermark,* pp. 504–508.

DICTA'95, University of Queensland, Brisbane, Dec. 5–8, 1995, A.Z. Tirkel et al.: *A Two–Dimensional Digital Watermark,* 7 pp.

ISSSSTA'96, Sep. 1996, Mainz, Germany, A.Z. Tirkel: *Image Watermarking —A Spread Spectrum Application,* 6 pp.

IEE Proceedings, vol. 143, No. 4, Aug. 1996, J.J.K. O Ruanaidh et al.: *Watermarking Digital Images for Copyright Protection,* pp. 250–256.

SPIE vol. 2952, EOS Series, Symposium on Advanced Imaging and Network Technologies, Berlin, Germany, Oct. 1996, F. Hartung and B. Girod: *Digital Watermarking of Raw and Compressed Video,* pp. 205–213.

METHOD FOR HUMAN-ASSISTED RANDOM KEY GENERATION AND APPLICATION FOR DIGITAL WATERMARK SYSTEM

FIELD OF INVENTION

With the advent of computer networks and digital multimedia, protection of intellectual property has become a prime concern for creators and publishers of digitized copies of copyrightable works, such as musical recordings, movies, and video games. One method of protecting copyrights in the digital domain is to use "digital watermarks". Digital watermarks can be used to mark each individual copy of a digitized work with information identifying the title, copyright holder, and even the licensed owner of a particular copy. The watermarks can also serve to allow for secured metering and support of other distribution systems of given media content and relevant information associated with them, including addresses, protocols, billing, pricing or distribution path parameters, among the many things that could constitute a "watermark." For further discussion of systems that are oriented around content-based addresses and directories, see U.S. Pat. No. 5,428,606 Moskowitz. When marked with licensing and ownership information, responsibility is created for individual copies where before there was none. More information on digital watermarks is set forth in "Steganographic Method and Device"—The DICE Company, U.S. application Ser. No. 08/489,172, now U.S. Pat. No. 5,613,004 the disclosure of which is hereby incorporated by reference. Also, "Technology: Digital Commerce", Denise Caruso, New York Times, Aug. 7, 1995 "Copyrighting in the Information Age", Harley Ungar, ONLINE MARKETPLACE, September 1995, Jupiter Communications further describe digital watermarks.

Additional information on other methods for hiding information signals in content signals, is disclosed in U.S. Pat. No. 5,319,735—Preuss et al. and U.S. Pat. No. 5,379,345—Greenberg.

Digital watermarks can be encoded with random or pseudo random keys, which act as secret maps for locating the watermarks. These keys make it impossible for a party without the key to find the watermark—in addition, the encoding method can be enhanced to force a party to cause damage to a watermarked data stream when trying to erase a random-key watermark.

It is desirable to be able to specify limitations on the application of such random or pseudo random keys in encoding a watermark to minimize artifacts in the content signal while maximizing encoding level. This preserves the quality of the content, while maximizing the security of the watermark. Security is maximized because erasing a watermark without a key results in the greatest amount of perceptible artifacts in the digital content. It is also desirable to separate the functionality of the decoder side of the process to provide fuller recognition and substantiation of the protection of goods that are essentially digitized bits, while ensuring the security of the encoder and the encoded content. It is also desirable that the separate decoder be incorporated into an agent, virus, search engine, or other autonomously operating or search function software. This would make it possible for parties possessing a decoder to verify the presence of valid watermarks in a data stream, without accessing the contents of the watermark. It would also be possible to scan or search archives for files containing watermarked content, and to verify the validity of the presence of such files in an archive, by means of the information contained in the watermarks. This scenario has particular application in screening large archives of files kept by on-line services and internet archives. It is further a goal of such processes to bring as much control of copyrights and content, including its pricing, billing, and distribution, to the parties that are responsible for creating and administering that content. It is another goal of the invention to provide a method for encoding multiple watermarks into a digital work, where each watermark can be accessed by use of a separate key. This ability can be used to provide access to watermark information to various parties with different levels of access. It is another goal of the invention to provide a mechanism which allows for accommodation of alternative methods encoding and decoding watermarks from within the same software or hardware infrastructure. This ability can be used to provide upgrades to the watermark system, without breaking support for decoding watermarks created by previous versions of the system. It is another goal of the invention to provide a mechanism for the certification and authentication, via a trusted third party, and public forums, of the information placed in a digital watermark. This provides additional corroboration of the information contained in a decoded digital watermark for the purpose of its use in prosecution of copyright infringement cases. It also has use in any situation in which a trusted third party verification is useful. It is another goal of this invention to provide an additional method for the synchronization of watermark decoding software to an embedded watermark signal that is more robust than previously disclosed methods.

SUMMARY OF THE INVENTION

The invention described herein is a human-assisted random key generation and application system for use in a digital watermark system. The invention allows an engineer or other individual, with specialized knowledge regarding processing and perception of a particular content type, such as digital audio or video, to observe a graphical representation of a subject digital recording or data stream, in conjunction with its presentation (listening or viewing) and to provide input to the key generation system that establishes a key generation "envelope", which determines how the key is used to apply a digital watermark to the digital data stream. The envelope limits the parameters of either or both the key generation system and the watermark application system, providing a rough guide within which a random or pseudo random key may be automatically generated and applied. This can provide a good fit to the content, such that the key may be used to encode a digital watermark into the content in such a manner as to minimize or limit the perceptible artifacts produced in the watermarked copy, while maximizing the signal encoding level. The invention further provides for variations in creating, retrieving, monitoring and manipulating watermarks to create better and more flexible approaches to working with copyrights in the digital domain.

Such a system is described herein and provides the user with a graphical representation of the content signal over time. In addition, it provides a way for the user to input constraints on the application of the digital watermark key, and provides a way to store this information with a random or pseudo random key sequence which is also generated to apply to a content signal. Such a system would also be more readily adaptable by current techniques to master content with personal computers and authoring/editing software. It would also enable individuals to monitor their copyrights with decoders to authenticate individual purchases, filter possible problematic and unpaid copyrightable materials in archives, and provide for a more generally distributed approach to the monitoring and protection of copyrights in the digital domain.

DETAILED DESCRIPTION

Figure 1:
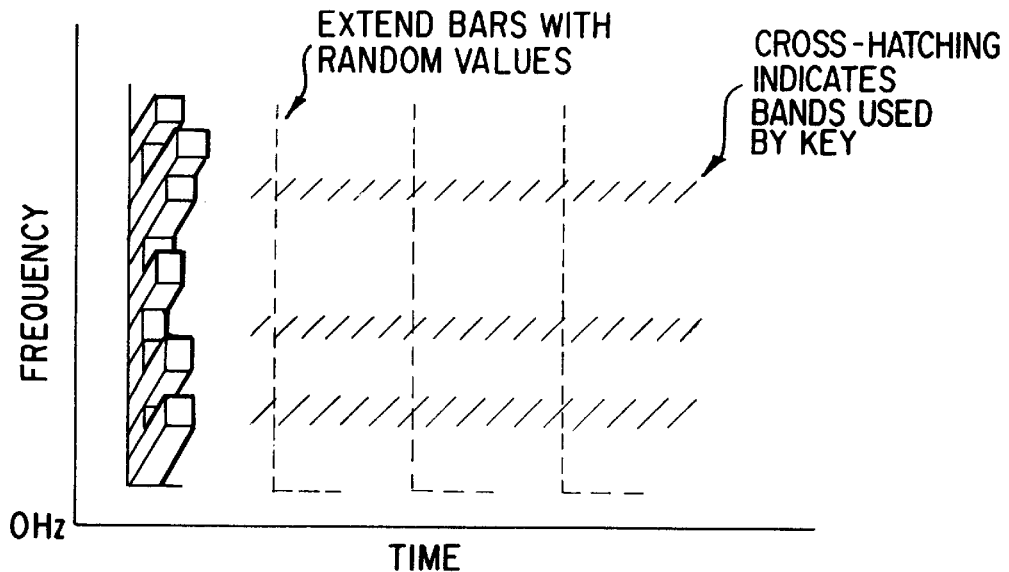
FIG. 1 illustrates a graphical representation for use in generating a key for digital watermarking in accordance with a first embodiment of the present invention.

Digital watermarks are created by encoding an information signal into a larger content signal. The information stream is integral with the content stream, creating a composite stream. The effectiveness and value of such watermarks are highest when the informational signal is difficult to remove, in the absence of the key, without causing perceptible artifacts in the content signal. The watermarked content signal itself should contain minimal or no perceptible artifacts of the information signal. To make a watermark virtually impossible to find without permissive use of the key, its encoding is dependent upon a randomly generated sequence of binary 1s and 0s, which act as the authorization key. Whoever possesses this key can access the watermark. In effect, the key is a map describing where in the content signal the information signal is hidden. This represents an improvement over existing efforts to protect copyrightable material through hardware-based solutions always existing outside the actual content. "Antipiracy" devices are used in present applications like VCRs, cable television boxes, and digital audio tape (DAT) recorders, but are quite often disabled by those who have some knowledge of the location of the device or choose not to purchase hardware with these "additional security features." With digital watermarks, the "protection," or more accurately, the deterrent, is hidden entirely in the signal, rather than a particular chip in the hardware.

Given a completely random key, which is uniformly applied over a content signal, resulting artifacts in the watermarked content signal are unpredictable, and depend on the interaction of the key and the content signal itself. One way to ensure minimization of artifacts is to use a low information signal level. However, this makes the watermark easier to erase, without causing audible artifacts in the content signal. This is a weakness. If the information signal level is boosted, there is the risk of generating audible artifacts.

The nature of the content signal generally varies significantly over time. During some segments, the signal may lend itself to masking artifacts that would otherwise be caused by high level encoding. At other times, any encoding is likely to cause artifacts. In addition, it might be worthwhile to encode low signal level information in a particular frequency range which corresponds to important frequency components of the content signal in a given segment of the content signal. This would make it difficult to perform bandpass filtering on the content signal to remove watermarks.

Given the benefits of such modifications to the application of the random key sequence in encoding a digital watermark, what is needed is a system which allows human-assisted key generation and application for digital watermarks. The term "human-assisted key generation" is used because in practice, the information describing how the random or pseudo random sequence key is to be applied must be stored with the key sequence. It is, in essence, part of the key itself, since the random or pseudo random sequence alone is not enough to encode, or possibly decode the watermark.

Encoding of digital watermarks into a content signal can be done in the time domain, by modifying content samples on a sample by sample basis, or in the frequency domain, by first performing a mathematical transform on a series of content samples in order to convert them into frequency domain information, subsequently modifying the frequency domain information with the watermark, and reverse transforming it back into time-based samples. The conversion between time and frequency domains can be accomplished by means of any of a class of mathematical transforms, known in general as "Fourier Transforms." There are various algorithmic implementations and optimizations in computer source code to enable computers to perform such transform calculations. The frequency domain method can be used to perform "spread spectrum" encoding implementations. Spread spectrum techniques are described in the prior art patents disclosed. Some of the shortcomings evident in these techniques relate to the fixed parameters for signal insertion in a sub audible level of the frequency-based domain, e.g., U.S. Pat. No. 5,319,735 Preuss et al. A straightforward randomization attack may be engaged to remove the signal by simply over-encoding random information continuously in all sub-bands of the spread spectrum signal band, which is fixed and well defined. Since the Preuss patent relies on masking effects to render the watermark signal, which is encoded at −15 dB relative to the carrier signal, inaudible, such a randomization attack will not result in audible artifacts in the carrier signal, or degradation of the content. More worrisome, the signal is not the original but a composite of an actual frequency in a known domain combined with another signal to create a "facsimile" or approximation, said to be imperceptible to a human observer, of the original copy. What results is the forced maintenance of one original to compare against subsequent "suspect" copies for examination. Human-assisted watermarking would provide an improvement over the art by providing flexibility as to where information signals would be inserted into content while giving the content creator the ability to check all subsequent copies without the requirement of a single original or master copy for comparison. Thus the present invention provides for a system where all necessary information is contained within the watermark itself.

Among other improvements over the art, generation of keys and encoding with human assistance would allow for a better match of a given informational signal (be it an ISRC code, an audio or voice file, serial number, or other "file" format) to the underlying content given differences in the make-up of the multitudes of forms of content (classical music, CD-ROM versions of the popular game DOOM, personal HTML Web pages, virtual reality simulations, etc.) and the ultimate wishes of the content creator or his agents. This translates into a better ability to maximize the watermark signal level, so as to force maximal damage to the content signal when there is an attempt to erase a watermark without the key. For instance, an engineer could select only the sections of a digital audio recording where there were high levels of distortion present in the original recording, while omitting those sections with relatively "pure" components from the watermark process. This then allows the engineer to encode the watermark at a relatively higher signal level in the selected sections without causing audible artifacts in the signal, since the changes to the signal caused by the watermark encoding will be masked by the distortion. A party wanting to erase the watermark has no idea, however, where or at what level a watermark is encoded, and so must choose to "erase" at the maximum level across the entire data stream, to be sure they have obliterated every instance of a watermark.

In the present invention, the input provided by the engineer is directly and immediately reflected in a graphical representation of content of that input, in a manner such that it is overlaid on a representation of the recorded signal. The key generation "envelope" described by the engineer can be dictated to vary dynamically over time, as the engineer chooses. The graphical representation of the content is typically rendered on a two dimensional computer screen, with a segment of the signal over time proceeding horizontally across the screen. The vertical axis is used to distinguish various frequency bands in the signal, while the cells described by the intersection of vertical and horizontal unit lines can signify relative amplitude values by either a brightness or a color value on the display. FIG. 1 provides an example of such a display.

Figure 2:
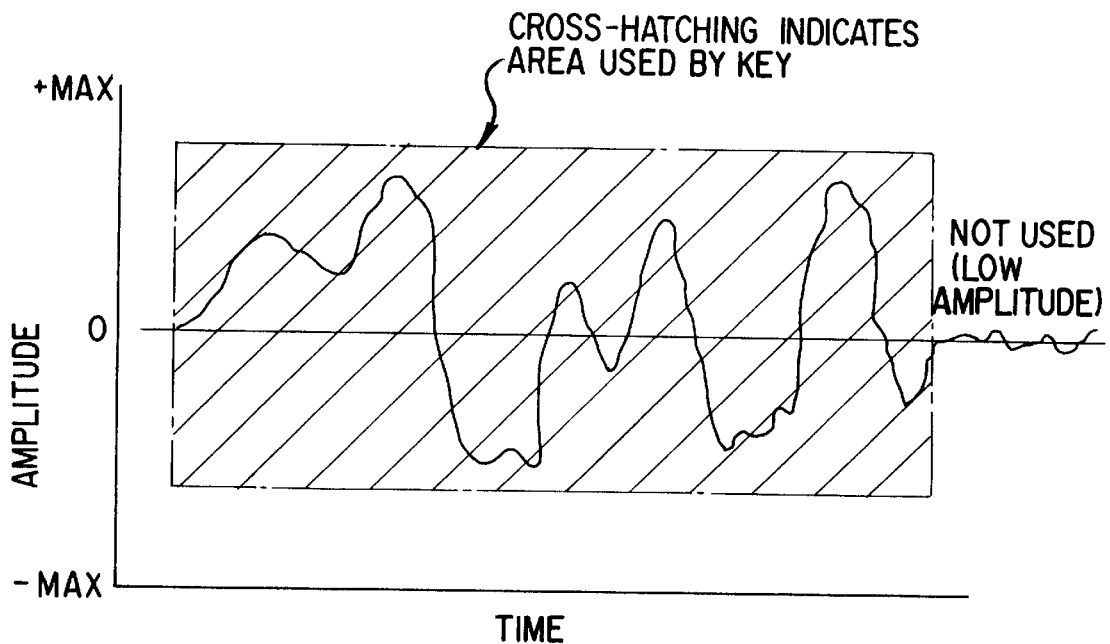
FIG. 2 illustrates a graphical representation for use in generating a key for digital watermarking in accordance with a second embodiment of the present invention.

Another possible configuration and operation of the system would use a display mapping time on the horizontal axis versus signal amplitude on the vertical axis. This is particularly useful for digital audio signals. In this case, an engineer could indicate certain time segments, perhaps those containing a highly distorted signal, to be used for watermark encoding, while other segments, which contain relatively pure signals, concentrated in a few bandwidths, may be exempt from watermarking. The engineer using a time vs. amplitude assisted key generation configuration would generally not input frequency limiting information. FIG. 2 provides an example of such a display.

In practice, the system might be used by an engineer or other user as follows:

The engineer loads a file containing the digitized content stream to be watermarked onto a computer. The engineer runs the key generation application and opens the file to be watermarked. The application opens a window which contains a graphical representation of the digitized samples. Typically, for digital audio, the engineer would see a rectangular area with time on the horizontal axis, frequency bands on the vertical axis, and varying color or brightness signifying signal power at a particular time and frequency band. Each vertical slice of the rectangle represents the frequency components, and their respective amplitude, at a particular instant ("small increment") of time. Typically, the display also provides means for scrolling from one end of the stream to the other if it is too long to fit on the screen, and for zooming in or out magnification in time or frequency. For the engineer, this rectangular area acts as a canvas. Using a mouse and/or keyboard, the engineer can scroll through the signal slowly marking out time segments or frequency band minima and maxima which dictate where, at what frequencies, and at what encoding signal level a watermark signal is to be encoded into the content, given a random or pseudo random key sequence. The engineer may limit these marks to all, none or any of the types of information discussed above. When the engineer is finished annotating the content signal, he or she selects a key generation function. At this point, all the annotated information is saved in a record and a random or pseudo random key sequence is generated associated with other information. At some later point, this combined key record can be used to encode and/or decode a watermark into this signal, or additional instances of it.

A suitable pseudo-random binary sequence for use as a key may be generated by: collecting some random timing information based on user keystrokes input to a keyboard device attached to the computer, performing a secure one way hash operation on this random timing data, using the results of the hash to seed a block cipher algorithm loop, and then cycling the block cipher and collecting a sequence of 1s and 0s from the cipher's output, until a pseudo-random sequence of 1s and 0s of desired length is obtained.

The key and its application information can then be saved together in a single database record within a database established for the purpose of archiving such information, and sorting and accessing it by particular criteria. This database should be encrypted with a passphrase to prevent the theft of its contents from the storage medium.

Another improvement in the invention is support for alternate encoding algorithm support. This can be accomplished for any function which relates to the encoding of the digital watermark by associating with the pseudo-random string of 1s and 0s comprising the pseudo-random key, a list of references to the appropriate functions for accomplishing the encoding. For a given function, these references can indicate a particular version of the function to use, or an entirely new one. The references can take the form of integer indexes which reference chunks of computer code, of alphanumeric strings which name such "code resources," or the memory address of the entry point of a piece of code already resident in computer memory. Such references are not, however, limited to the above examples. In the implementation of software, based on this and previous filings, each key contains associated references to functions identified as CODEC—basic encode/decode algorithm which encodes and decodes bits of information directly to and from the content signal, MAP—a function which relates the bits of the key to the content stream, FILTER—a function which describes how to pre-filter the content signal, prior to encoding or decoding, CIPHER—a function which provides encryption and decryption services for information contained in the watermark, and ERRCODE—a function which further encodes/decodes watermark information so that errors introduced into a watermark may be corrected after extraction from the content signal.

Additionally, a new method of synchronizing decoder software to an embedded watermark is described. In a previous disclosure, a method whereby a marker sequence of N random bits was generated, and used to signal the start of an encoded watermark was described. When the decoder recognizes the N bit sequence, it knows it is synchronized. In that system the chance of a false positive synchronization was estimated at $1/(N^2)$ ("one over (N to the power of 2)"). While that method is fairly reliable, it depends on the marker being encoded as part of the steganographic process, into the content stream. While errors in the encoded bits may be partially offset by error coding techniques, error coding the marker will require more computation and complexity in the system. It also does not completely eliminate the possibility that a randomization attack can succeed in destroying the marker. A new method is implemented in which the encoder pre-processes the digital sample stream, calculating where watermark information will be encoded. As it is doing this, it notes the starting position of each complete watermark, and records to a file, a sequence of N-bits representing sample information corresponding to the start of the watermark, for instance, the 3rd most significant bit of the 256 samples immediately preceding the start of a watermark. This would be a 256 bit marker. The order in which these markers are encountered is preserved, as it is important. The decoder then searches for matches to these markers. It processes the markers from first to last, discarding each as it is found, or possibly not found within a certain scanning distance, and proceeding with the remaining markers. This method does not modify the original signal with marker information and has the added benefit that high-significance sequences can be used, requiring that an attack based on randomizing markers do very obvious damage to the content stream.

With multichannel encoding, both private and public keys, similar in use to those from public-key cryptosystems, could be provided for authentication by concerned third party vendors and consumers, as well as contribute to better management and protection of copyrights for the digital world that already exist in the physical world. For more information on public-key cryptosystems see U.S. Pat. No. 4,200,770 Diffie-Hellman, U.S. Pat. No. 4,218,582 Hellman, U.S. Pat. No. 4,405,829 RSA, U.S. Pat. No. 4,424,414 Hellman Pohlig. In addition, any number of key "designations" between "public" and "private" could be established, to provide various access privileges to different groups. Multi-channel watermarks are effected by encoding separate watermark certificates with separate keys by either interleaving windows in the time domain or by using separate frequency bands in the frequency domain. For instance, 3 separate watermarks could be encoded by using every third sample window processed to encode a corresponding certificate. Alternatively, complete watermarks could be interleaved. Similarly, the frequency range of an audio recording might be partitioned into 3 sub-ranges for such a purpose. Use of multi-channel watermarks would allow groups with varying access privileges to access watermark information in a given content signal. The methods of multichannel encoding would further provide for more holographic and inexpensive maintenance of copyrights by parties that have differing levels of access priority as decided by the ultimate owner or publisher of the underlying content. Some watermarks could even play significant roles in adhering to given filtering (for example, content that is not intended for all observers), distribution, and even pricing schemes for given pieces of content. Further, on-the-fly watermarking could enhance identification of pieces of content that are traded between a number of parties or in a number of levels of distribution. Previously discussed patents by Preuss et al. and Greenberg and other similar systems lack this feature.

Further improvements over the prior art include the general capacity and robustness of the given piece of information that can be inserted into media content with digital watermarks, described in Steganographic Method and Device and further modified here, versus "spread spectrum-only" methods. First, the spread spectrum technique described in U.S. Pat. No. 5,319,735 Preuss et al. is limited to an encoding rate of 4.3 8-bit symbols per second within a digital audio signal. This is because of the nature of reliability requirements for spread spectrum systems. The methods described in this invention and those of the previous application, "Steganographic Method and Device," do not particularly adhere to the use of such spread spectrum techniques, thus removing such limitation. In the steganographic derived implementation the inventors have developed based on these filings, watermarks of approximately 1,000 bytes (or 1000×8 bits) were encoded at a rate of more than 2 complete watermarks per second into the carrier signal. The carrier signal was a two channel (stereo) 16-bit, 44.1 Khz recording. The cited encoding rate is per channel. This has been successfully tested in a number of audio signals. While this capacity is likely to decrease by 50% or more as a result of future improvements to the security of the system, it should still far exceed the 4.3 symbols per second envisioned by Preuss et al. Second, the ability exists to recover the watermarked information with a sample of the overall piece of digitized content (that is, for instance, being able to recover a watermark from just 10 seconds of a 3 minute song, depending on the robustness or size of the data in a given watermark) instead of a full original. Third, the encoding process described in Steganographic Method and Device and further modified in this invention explicitly seeks to encode the information signal in such a way with the underlying content signal as to make destruction of the watermark cause destruction of the underlying signal. The prior art describes methods that confuse the outright destruction of the underlying content with "the level of difficulty" of removing or altering information signals that may destroy underlying content. This invention anticipates efforts that can be undertaken with software, such as Digidesign's Sound Designer II or Passport Design's Alchemy, which gives audio engineers (similar authoring software for video also exists, for instance, that sold by Avid Technology, and others as well as the large library of picture authoring tools) very precise control of digital signals, "embedded" or otherwise, that can be purely manipulated in the frequency domain. Such software provides for bandpass filtering and noise elimination options that may be directed at specific ranges of the frequency domain, a ripe method for attack in order to hamper recovery of watermark information encoded in specific frequency ranges.

Separating the decoder from the encoder can limit the ability to reverse the encoding process while providing a reliable method for third parties to be able to make attempts to screen their archives for watermarked content without being able to tamper with all of the actual watermarks. This can be further facilitated by placing separate signals in the content using the encoder, which signal the presence of a valid watermark, e.g. by providing a "public key accessible" watermark channel which contains information comprised of a digitally signed digital notary registration of the watermark in the private channel, along with a checksum verifying the content stream. The checksum reflects the unique nature of the actual samples which contain the watermark in question, and therefore would provide a means to detect an attempt to graft a watermark lifted from one recording and placed into another recording in an attempt to deceive decoding software of the nature of the recording in question. During encoding, the encoder can leave room within the watermark for the checksum, and analyze the portion of the content stream which will contain the watermark in order to generate the checksum before the watermark is encoded. Once the checksum is computed, the complete watermark certificate, which now contains the checksum, is signed and/or encrypted, which prevents modification of any portion of the certificate, including the checksum, and finally encoded into the stream. Thus, if it is somehow moved at a later time, that fact can be detected by decoders. Once the decoder functions are separate from the encoder, watermark decoding functionality could be embedded in several types of software including search agents, viruses, and automated archive scanners. Such software could then be used to screen files or search out files from archive which contain specific watermark information, types of watermarks, or lack watermarks. For instance, an online service could, as policy, refuse to archive any digital audio file which does not contain a valid watermark notarized by a trusted digital notary. It could then run automated software to continuously scan its archive for digital audio files which lack such watermarks, and erase them.

Watermarks can be generated to contain information to be used in effecting software or content metering services. In order to accomplish this, the watermark would include various fields selected from the following information:

title identification;

unit measure;

unit price;

percentage transfer threshold at which liability is incurred to purchaser;

percent of content transferred;

authorized purchaser identification;

seller account identification;

payment means identification;

digitally signed information from sender indicating percent of content transferred; and digitally signed information from receiver indicating percent of content received.

These "metering" watermarks could be dependent on a near continuous exchange of information between the transmitter and receiver of the metered information in question. The idea is that both sides must agree to what the watermark says, by digitally signing it. The sender agrees they have sent a certain amount of a certain title, for instance, and the receiver agrees they have received it, possibly incurring a liability to pay for the information once a certain threshold is passed. If the parties disagree, the transaction can be discontinued before such time. In addition, metering watermarks could contain account information or other payment information which would facilitate the transaction.

Watermarks can also be made to contain information pertaining to geographical or electronic distribution restrictions, or which contain information on where to locate other copies of this content, or similar content. For instance, a watermark might stipulate that a recording is for sale only in the United States, or that it is to be sold only to persons connecting to an online distribution site from a certain set of internet domain names, like ".us" for United States, or ".ny" for New York. Further a watermark might contain one or more URLs describing online sites where similar content that the buyer of a piece of content might be interested in can be found.

A digital notary could also be used in a more general way to register, time stamp and authenticate the information inside a watermark, which is referred to as the certificate. A digital notary processes a document which contains information and assigns to it a unique identification number which is a mathematical function of the contents of the document. The notary also generally includes a time stamp in the document along with the notary's own digital signature to verify the date and time it received and "notarized" the document. After being so notarized, the document cannot be altered in any way without voiding its mathematically computed signature. To further enhance trust in such a system, the notary may publish in a public forum, such as a newspaper, which bears a verifiable date, the notarization signatures of all documents notarized on a given date. This process would significantly enhance the trust placed in a digital watermark extracted for the purpose of use in settling legal disputes over copyright ownership and infringement.

Other "spread spectrum" techniques described in the art have predefined time stamps to serve the purpose of verifying the actual time a particular piece of content is being played by a broadcaster, e.g., U.S. Pat. No. 5,379,345 Greenberg, not the insertion and control of a copyright or similar information (such as distribution path, billing, metering) by the owner or publisher of the content. The Greenberg patent focuses almost exclusively on concerns of broadcasters, not content creators who deal with digitized media content when distributing their copyrightable materials to unknown parties. The methods described are specific to spread spectrum insertion of signals as "segment timing marks" to make comparisons against a specific master of the underlying broadcast material—again with the intention of specifying if the broadcast was made according to agreed terms with the advertisers. No provisions are made for stamping given audio signals or other digital signals with "purchaser" or publisher information to stamp the individual piece of content in a manner similar to the sales of physical media products (CDs, CD-ROMs, etc.) or other products in general (pizza delivery, direct mail purchases, etc.). In other words, "interval-defining signals," as described in the Greenberg patent, are important for verification of broadcasts of a time-based commodity like time and date-specific, reserved broadcast time, but have little use for individuals trying to specify distribution paths, pricing, or protect copyrights relating to given content which may be used repeatedly by consumers for many years. It would also lack any provisions for the "serialization" and identification of individual copies of media content as it can be distributed or exchanged on the Internet or in other on-line systems (via telephones, cables, or any other electronic transmission media). Finally, the Greenberg patent ties itself specifically to broadcast infrastructure, with the described encoding occurring just before transmission of the content signal via analog or digital broadcast, and decoding occurring upon reception.

While the discussion above has described the invention and its use within specific embodiments, it should be clear to those skilled in the art that numerous modifications may be made to the above without departing from the spirit of the invention, and that the scope of the above invention is to be limited only by the claims appended hereto.

What is claimed:

1. A method for using a computer system to generate a key for digital watermarking, the method comprising the steps of:

identifying a digital sample stream in which a digital watermark is to be encoded;

selecting a random or pseudo-random sequence for use in encoding the digital watermark within the digital sample stream;

receiving human interactive input information describing application of the random or pseudo-random sequence to the digital sample stream; and generating a key associating the random or pseudo-random sequence with the human interactive input information.

2. The method of claim 1, wherein said step of identifying a digital sample stream comprises selecting a digital sample stream from a list provided by the computer system.

3. The method of claim 2, wherein the computer system includes a display device, said method further comprising the step of displaying a graphical representation of the digital sample stream on the display device, the graphical representation including at least one of:

a time axis and a signal frequency axis;

a time axis and a signal amplitude axis; and a vertical axis and a horizontal axis.

4. The method of claim 3, wherein the human interactive input information includes at least one of:

one or more time delimiters;

one or more frequency delimiters;

a signal encoding level; and one or more area delimiters.

5. The method of claim 4, further comprising the step of updating the graphical representation to reflect receipt of human interactive input information.

6. The method of claim 5, wherein the random or pseudo-random sequence comprises a binary sequence of 1s and 0s.

7. The method of claim 6, wherein the computer system further includes a database, the method further comprising the step of storing the generated key as a record in the database.

8. The method of claim 7, further comprising the step of encrypting the record containing the generated key using a passphrase.

9. The method of claim 6, wherein the computer system further includes a keyboard, said step of selecting a random or pseudo-random sequence comprising the substeps of:

(a) collecting a series of random bits derived from keyboard latency intervals in random typing;

(b) processing the series of random bits through a secure one-way hash function;

(c) using the results of the secure one-way hash function to seed a block encryption cipher loop;

(d) cycling through the block encryption cipher loop, extracting the least significant bit of each result of the secure one-way hash function after each cycle; and (e) concatenating the extracted bits to form the random or pseudo-random sequence.

10. The method of claim 1, wherein the method is implemented using an encoder and a decoder comprising separate software applications or hardware devices.

11. The method of claim 10, wherein the digital watermark comprises a multi-channel watermark, said step of generating a key comprising generating a public watermark key providing the decoder with access to only a watermark channel corresponding to the public watermark key.

12. The method of claim 11, wherein the decoder can access only a limited number of watermark channels of the multi-channel watermark corresponding to public watermark keys made available to the decoder.

13. The method of claim 1, wherein the public watermark key enables the decoder to detect the presence of a valid watermark but not to access information in the watermark.

14. The method of claim 10, further comprising the step of placing a separate signal which does not interfere with the watermark into the digital sample stream, wherein the separate signal indicates at least one of:

watermark synchronization information for locating the digital watermark in the digital sample stream; and presence of a valid watermark in the digital sample stream.

15. The method of claim 1, wherein the human interactive input information includes a list of time delimiters describing temporal segments of the digital sample stream.

16. The method of claim 1, wherein the human interactive input information includes a list of frequency delimiters describing frequency bands to be included in watermark computations.

17. The method of claim 1, wherein the human interactive input information includes a list of area delimiters.

18. The method of claim 1, wherein the human interactive input information includes a signal encoding level.

19. The method of claim 1, wherein the human interactive input information includes a sample window size for watermark computations.

20. The method of claim 1, wherein the human interactive input information includes encoding channel utilization information.

21. The method of claim 20, wherein the encoding channel utilization information includes mono, stereo or other sample channels to be watermarked.

22. The method of claim 1, wherein human interactive input information includes at least one of:

a list of time delimiters describing segments of the digital sample stream;

a list of frequency delimiters describing frequency bands to be included in watermark computations;

a signal encoding level;

a sample window size for watermark computations; and encoding channel utilization information.

23. The method of claim 22, wherein the human interactive input information describes limits on where in the digital sample stream, at what encoding level, and in which frequency bands in the digital sample stream the random or pseudo-random sequence is to be applied for the purpose of encoding the digital watermark into the digital sample stream, the human interactive input information comprising at least one of:

a list of time delimiters;

a list of frequency delimiters;

a list of area delimiters; and a signal encoding level.

24. The method of claim 23, wherein the digital sample stream corresponds to at least one of:

an audio recording;

a video recording; and an image.

25. The method of claim 1, further comprising the step of encoding multiple copies of a digital watermark into a single digital sample stream.

26. The method of claim 25, further comprising the step of interleaving watermark information from each digital watermark in a time domain.

27. The method of claim 25, further comprising the step of selectively placing watermark information from each digital watermark into specific frequency bands of the digital sample stream or interleaving watermark information from each digital watermark in a frequency domain.

28. The method of claim 23, wherein time delimiters are preselected, prior to user modification or selection, based upon measured properties of a segment of the digital sample stream, the time delimiters being determined based upon mathematical calculations of at least one of the following signal properties:

autocorrelation;

root mean squared energy;

mean squared difference in samples;

distortion; and spectral energy characteristics.

29. The method of claim 23, wherein frequency delimiters are preselected, prior to user modification or selection, based upon measured properties of a segment of the digital sample stream, the frequency delimiters being determined based upon mathematical calculations of at least one of the following signal properties:

autocorrelation;

root mean squared energy;

mean squared difference in samples;

distortion; and spectral energy characteristics.

30. The method of claim 23, wherein signal encoding levels at specific temporal locations in a segment of the digital sample stream are preselected, prior to user modification or selection, based upon measured properties of signals contained in the segment, the signal encoding levels being determined based upon mathematical calculations of one or more of the following signal properties:

autocorrelation;

root mean squared energy;

mean squared difference in samples;

distortion; and spectral energy characteristics.

31. A method of using digital watermarks to convey information for a content metering service, the method comprising the steps of:

identifying a digital sample stream corresponding to content in which a digital watermark is to be encoded wherein the digital watermark contains at least one of a title identification, a unit measure, a unit price, a percentage transfer threshold at which liability is incurred to a purchaser, a percent of content transferred, an authorized purchaser identification, a seller account identification, a payment means identification, a digitally-signed information from a sender indicating a percent of content transferred, and digitally-signed information from a receiver indicating a percent of content received;

selecting a random or pseudo-random sequence for use in encoding the digital watermark within the digital sample stream:

receiving human interactive input information describing application of the random or pseudo-random sequence to the digital sample stream; and generating a key associating the random or pseudo-random sequence with the human interactive input information.

32. A method of encoding digital watermarks which contain information pertaining to distribution restrictions and a location of an addressable directory containing related content, the method comprising the steps of:

identifying a digital sample stream in which the digital watermarks are to be encoded wherein the digital watermarks contain at least one of a geographical constraint on distribution, a logical constraint on distribution, a Universal Resource Locator, a telephone number, an Internet Protocol address, an Internet domain name, an E-mail address, and a file name;

selecting a random or pseudo-random sequence for use in encoding the digital watermarks within the digital sample stream;

receiving human interactive input information describing application of the random or pseudo-random sequence to the digital sample stream; and generating a key associating the random or pseudo-random sequence with the human interactive input information.

33. The method of claim 1, further comprising the step of encoding multiple digital watermarks into a single digital sample stream, wherein each digital watermark is encoded with a separate key.

34. The method of claim 33, further comprising the step of interleaving watermark information from each digital watermark in a time domain.

35. The method of claim 33, further comprising the step of selectively placing watermark information from each digital watermark into specific frequency bands of the digital sample stream or interleaving watermark information from each digital watermark in a frequency domain.

36. The method of claim 1, further comprising the step of associating a list of component function references with the generated key, the list of component function references dictating component functions to be applied in encoding and decoding the digital watermark.

* * * * *